Jan. 7, 1958 B. M. GORDON ET AL 2,819,394

HIGH SPEED REVERSIBLE COUNTER

Filed Nov. 10, 1953 2 Sheets-Sheet 1

INVENTORS
BERNARD M. GORDON
MARSHALL M. KINCAID
BY Joseph Weingarten
ATTORNEY

HIGH SPEED REVERSIBLE COUNTER

Filed Nov. 10, 1953 2 Sheets-Sheet 2

INVENTORS
BERNARD M. GORDON
MARSHALL M. KINCAID
BY Joseph Weingarten
ATTORNEY 2,819,394

HIGH SPEED REVERSIBLE COUNTER

Bernard M. Gordon, Concord, and Marshall M. Kincaid, Everett, Mass., assignors to Laboratory For Electronics, Inc., Boston, Mass., a corporation of Delaware Application November 10, 1953, Serial No. 391,285

6 Claims. (Cl. 250—27)

Figure 1:
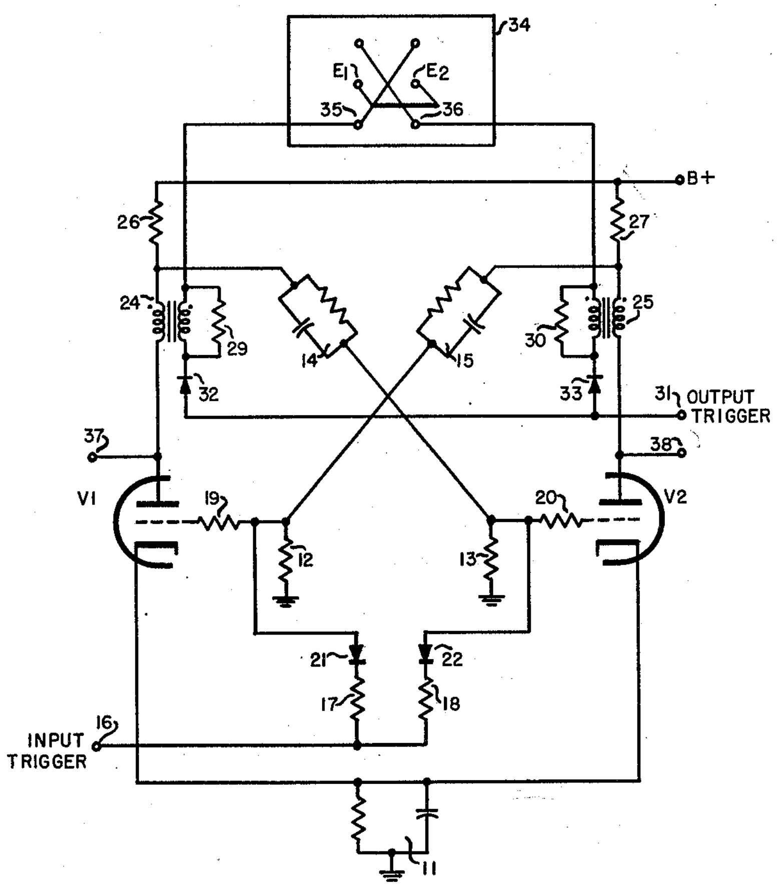

The present invention relates in general to electronic trigger circuits and more particularly concerns an electronic binary counter capable of dependable normal or reversible performance at exceptionally high counting rates with conventional low power triode tubes.

Broadly speaking, the binary counter is a circuit which presents some indication in binary notation of the sum of a train of impressed input pulses. A reversible, or forward-backward, binary counter is fundamentally similar in that it will sum the impulses in an input pulse train; however, additionally, under the influence of a control potential, it will perform the function of subtraction of subsequent pulses from the count already accumulated. Each input trigger pulse will actuate the counter, but it is the control signal which determines whether the ultimate effect is that of binary addition or subtraction.

Considerable effort has been expended on the problem of raising the upper counting speeds of conventional binary counting circuits. Since a reversal of the stable states established in a counter is basically a capacitive charging-discharging phenomenon, the approach most commonly advanced increases the charging current availability. With counters formed of power tubes such as the 6L6 and 807, reliable counting speeds up to several megacycles per second have been constructed; but with a minimum of two power tubes per binary counting stage, it is evident that a counter capable of storing a comparatively large binary number becomes a physically unwieldy and costly power consuming device of limited application.

The present invention contemplates and has as a primary object the provision of a basic binary counting stage using commercially available standardized low power receiving tube triodes with magnetic or air core pulse transformer outputs in circuits reliably operative at counting rates heretofore unattainable. In accordance with the principles of this invention, any number of these basic stages may be cascaded for the accumulation of a desired count without adversely affecting the rapidity of operation and the basic reliability available from each stage.

Another object of this invention is to utilize the pulse transformer outputs of the basic counter stage in a novel circuit arrangement for achieving forward-backward counter operation under the control of a single potential switching source, irrespective of the number of counter stages used in cascade. As will become apparent, counter operation may be reversed at a speed compatible with the counting rate, thereby substantially avoiding error or ambiguity which would result from an overly lengthy or indeterminate switching interval.

A further object of this invention is to provide means for avoiding counting error due to variations in input pulse time duration and waveform.

Figure 2:
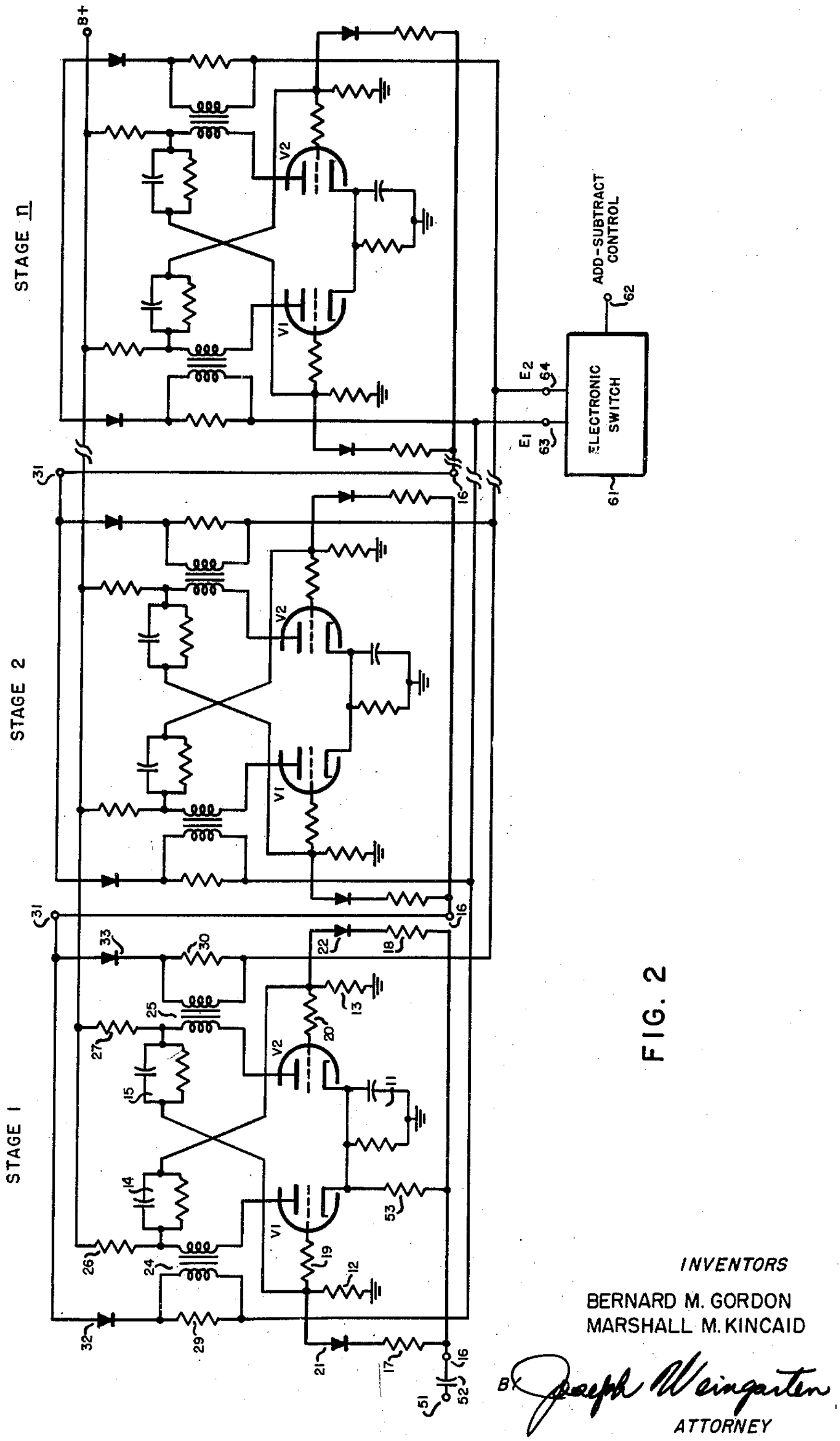

These and other objects of the present invention will now become apparent from the following detailed specification when taken in connection with the accompanying drawing in which:

Fig. 1 is a schematic circuit diagram illustrating the components of the basic counter stage of this invention; and Fig. 2 is a schematic circuit diagram illustrating the manner in which binary stages of the type generally illustrated in Fig. 1 may be cascaded for reversible counter performance.

With reference now to the drawing and more particularly to Fig. 1 thereof, there is illustrated the basic circuit for a counter stage incorporating the novel principles of this invention. To a certain extent, this counter stage follows the general design pattern of the more conventional flip-flops. Thus, the circuit of Fig. 1 includes an inherently bistable arrangement of electron tube triodes V1 and V2 having a common cathode connection and a common resistance-capacitance cathode biasing circuit 11. The grids of tubes V1 and V2 are returned to ground through grid resistors 12 and 13, respectively, and through parallel resistance-capacitance cross-over networks 14 and 15, each grid is returned to the plate circuit of the opposite tube. Input terminal 16 is symmetrically coupled to the tube grids through a pair of like resistors 17 and 18, in series with semi-conductor diodes 21 and 22, respectively, poled for the transmission of negative input pulses. Resistors 19 and 20, of relatively low value, are used to avoid undesirable oscillation, in the conventional manner.

Associated with tubes V1 and V2 are output pulse transformers 24 and 25, respectively. In Fig. 1, solid magnetic core material has been indicated on the drawing, but later it will be shown that the nature of the core is a function of application. One end of the primary winding of each transformer is directly connected to the respective plate, and suitable current limiting load resistors 26 and 27 are used to connect opposite ends to the positive power source B+. It will be observed that each of the cross-over networks 14 and 15 are joined to the respective plate circuit at the junction between load resistor and transformer primary. Resultantly, static bleeder currents flowing through grid resistors 12 and 13, cross-over networks 14 and 15, and resistors 27 and 26, do not pass through the pulse transformer primary windings.

The secondary windings of pulse transformers 24 and 25 (shunted by damping resistors 29 and 30, respectively) selectively provide the counter stage output trigger. One end of each secondary is connected to output terminal 31 through semi-conductor diodes 32 and 33, these diodes being poled for transmission of negative output pulses. The opposite ends of the secondary windings are coupled to switch 34, which for explanatory purposes, has been illustrated simply as a manually operative reversing switch capable of establishing two static potentials $E_1$ and $E_2$ at its terminals 35 and 36, or vice-versa. The relative magnitudes and the significance of these potentials will be discussed below.

Transformers 24 and 25 are symmetrically arranged (relative polarity being indicated by the conventional dot symbolism) and for the particular embodiment shown, both secondaries are connected to yield negative pulses at the output diodes 32 and 33 when the plate current in the associated tube is first initiated. Through the use of pulse transformers, the effect of instantaneously cutting-on a tube is to provide a sharp negative potential spike in the secondary having an exceptionally steep leading edge. Each transformer differentiates the square potential waveform at the respective tube plate without deterioration in character of the leading edge. It has been observed that plate current initiation is accompanied by a steeper wave front than cut-off, so that sharper output triggers with consequent higher operating speeds are possible with the circuit as shown. Positive pulses generated in the secondary circuits when a tube is instantaneously cut-off are without effect on the stage output at terminal 31 due to polarity of diodes 32 and 33.

As with conventional bistable circuits, when the arrangement of Fig. 1 is energized, one of tubes V1 or V2 will be conducting and the other cut-off. Conduction in either tube will establish a suitable positive cathode potential with respect to ground. The potential at the grid of the conducting tube will be positive and slightly in excess of the cathode potential while the grid of the non-conducting tube will be positive due to bleeder current, but well below cut-off bias with respect to cathode voltage.

For discussion purposes, assume that initially, tube V1 is conducting with tube V2 cut-off. The application of a sharp negative trigger to input terminal 16 will substantially instantaneously equally lower the potentials of both control grids through diodes 21 and 22, with the ultimate result that tube V1 will be cut-off, tube V2 will be driven into conduction. As a result of the abrupt termination of current through the primary of transformer 24 and the equally abrupt initiation of current through the primary of transformer 25, sharply defined output pulses of opposite polarity will be induced in the respective secondary windings. With windings arranged as above, transformer 25 will provide a negative trigger and transformer 24 a positive trigger, but both triggers, with respect to terminal 31, are superimposed upon the static potential levels established by switch 34 at output terminals 35 and 36. With an appropriate choice of these potentials, the tube transferring output negative triggers to terminal 31 is determined.

When terminal 16 is negatively pulsed, the diode 21 or 22 connected to the more positive grid will conduct. If the input waveform is a negative pulse of fairly long duration relative to the time required to switch tubes V1 and V2, there would be a normal tendency to reduce switching time. However, resistors 17 and 18 effectively decouple the tube grids from the stage input, and as a result, switchover time is substantially independent of input wave shape.

Although output triggers are obtained at terminal 31 for energizing a consecutive stage, the binary count of a particular stage, such as that shown in Fig. 1, is determined by the relative potentials appearing at terminals 37 and 38 at the plates of triodes V1 and V2, respectively. By suitable means, well-known in this art, the rise and fall of voltage at these terminals may be used to actuate associated computer circuits, indicator lights, or other circuitry as required by the particular counter application. The utilization circuits driven by the counter and the means for restoring the counter to zero or some other desired initial state do not form part of the present invention.

The schematic circuit diagram of Fig. 1 has been presented primarily to illustrate the components going into the organization of a counter stage. The utility of such a circuit and the advantages achieved through the use of this design are best illustrated and understood with reference to Fig. 2, which is a circuit diagram of a binary counter formed by cascading a plurality of stages such as shown in Fig. 1. The number of stages so cascaded is substantially independent of the design of a particular stage and as many stages as needed in a specific application may be connected together. To indicate this generality in Fig. 2 within space limitations, three like stages have been illustrated, input stage 1 being connected to stage 2, which in turn is separated from the final circuit, stage *n*, by a break in the wiring. Any number of cascaded intervening, identical stages may be inserted in the region indicated by the break. In each stage, like components have been designated by like reference numerals and the similarity of elements in each stage to that shown in Fig. 1 has been depicted by use of the same numerals where applicable.

The input signal to the binary counter shown in Fig. 2 is applied in the form of negative triggers at terminal 51. These signals are coupled through capacitor 52 to input terminal 16 of stage 1. Stage 1 differs from the remaining cascaded stages only in that resistor 53, between the cathodes of tubes V1 and V2 and terminal 16, is used to provide a discharge path for input coupling capacitor 52.

The counter illustrated in Fig. 2 is arranged for reversible operation under control of an electronic switch 61 which functions in response to an add-subtract control trigger applied at terminals 62 to establish control potentials $E_1$ and $E_2$, or vice-versa at its output terminals 63 and 64. In Fig. 1, the count-reversing switch was shown as manually operated. In actual practice, switch 61 may comprise a bistable circuit or flip-flop whose output may be switched substantially instantaneously by a trigger applied at terminal 62. In fact, reversible operation at speeds compatible with the counting rate of counter stages 1 to *n* may be realized by using a flip-flop of the same general circuit design as the counter stage itself. By appropriate selection of potentials and other circuit parameters, the plates of the triodes (not shown) used for electronic switch 61 may be selected to furnish and switch the necessary potentials $E_1$ and $E_2$. As shown in the drawing, the secondary of transformer 24 in each stage is connected to terminal 63; and the secondary of transformer 25 in each stage, to terminal 64.

The operation of the multi-stage counter shown in Fig. 2 may now be discussed in detail. It is believed that by assigning typical potentials to the various terminals as they appear in a practical embodiment, the operation will be more readily understood.

Thus, assume that for the circuit shown in Fig. 2, the positive power source B+ is 225 volts, which establishes a cathode potential in each stage of 78 volts, and that terminals $E_1$ and $E_2$ are set positively at 115 volts and 78 volts, respectively. With tube V1 conducting and tube V2 non-conducting, typical grid potentials would be 79 volts and 44 volts, respectively.

The application of a negative trigger to terminal 51 will, in stage 1, cut-off tube V1 and initiate conduction in tube V2. As noted earlier, cut-off of tube V1 will generate a positive pulse in the secondary of transformer 24 which, as superimposed upon the positive 115 volts appearing at terminal $E_1$, will have no effect on transferring signals through terminal 31 to the input grids of stage 2. However, cutting-on tube V2 will generate a sharp negative trigger in the secondary of transformer 25 which, superimposed upon the static potential of 78 volts established at terminal $E_2$, will transfer a negative pulse through diode 33 to the grids following stage. If in this consecutive stage tube V1 is conducting, the negative input trigger will cause a change in stable state therein. The following negative trigger applied at terminal 51 will cut-off tube V2 and cut-on tube V1 in the first stage. The negative trigger generated in cutting-on tube V1, when superimposed upon the positive 115 volts established at terminal 63, will not transfer a pulse to the next successive stage. This, of course, requires that the size of the negative trigger generated in the transformer secondary be insufficient in magnitude to overcome the potential set by switch 61 and cause conduction in diode 32. Since in the example under consideration, the potential at the grid of the conducting tube in the succeeding stage is 79 volts and the potential at terminal 63 is 115 volts, no signal will be transferred unless the negative pulse is greater than the difference, 36 volts. By adjusting the tube currents and the transformer ratio, satisfactory operation has been achieved with a trigger of 18 volts.

From the foregoing, it is apparent that with the aforesaid potentials at terminals 63 and 64, a succession of negative triggers applied to terminal 51 will result in a counting operation wherein interstage triggers are available only when tube V2 in any stage is cut-on. If initially all tubes V1 are conducting and all tubes V2 are cut-off, then *n* counter stages shown will sum negative pulses applied to terminal 51 in the conventional binary fashion.

If at any time a trigger is applied to terminal 62 to effect a reversal of the static potentials at terminals 63 and 64, interstage negative triggers will then be available only when tubes V1 are cut-on. This effective reversal results in counter operation whereby successive negative triggers applied to terminal 51 are subtracted from whatever count has already been accumulated in the *n* binary stages. The ultimate count, whether addition or subtraction is used, is derived for an appropriate utilization circuit from the plates of tubes V1 and V2 in each stage, as earlier noted in connection with Fig. 1.

From the foregoing, it may be seen that through the use of a pair of pulse transformers in each binary stage, two immediate advantages are realized, one of which is extremely rapid counter reversibility with a minimum of additional components, and the other, the ability to operate at exceptionally high input trigger frequencies. As pulse transformers are inherently static components, their use in no way affect system reliability due to aging or the like.

The superior performance achieved by this invention may be best appreciated by examination of operation with a typical combination of circuit parameters (which parameters are associated with the operating potentials discussed above):

| | |
|---|---|
| Resistors 26 and 27 | 20K ohms. |
| Resistors 12 and 13 | 30K ohms. |
| Resistors 17 and 18 | 12K ohms. |
| Cross-over networks 14 and 15 | R=50K ohms, C =100 μμf. |
| Cathode bias network 11 | R=13K ohms, C =.01 μf. |
| Diodes 21, 22, 32 and 33 | 1N34 germanium crystals. |
| Resistors 29 and 30 | 5,000 ohms. |
| Resistors 19 and 20 | 100 ohms. |
| Tubes V1 and V2 | one 2C51 twin triode. |

In the above tabulation, the details of the pulse transformers were omitted. The nature of the transformer is to a large extent determined by the frequency range of operation, and with the above parameters, it has been found that with ten turns for both primary and secondary on one-half inch diameter ferramic cores, a 10 megacycle counting rate is easily attained. With air core pulse transformers, dependable operation at still higher frequencies is possible. For all frequencies of operation, the effective count was found reversible within one counting cycle by the appropriate application of a sharply defined trigger to terminal 62 of the electronic switch 61.

It is apparent that various circuit changes may be made for specific applications. For example, if it is desired to retain the features of high speed without reversibility, the transformer in each of tubes V1 and V2 may be omitted entirely. By simple reversal of the transformer secondary or primary windings, the system may be made to transfer interstage trigger pulses when a tube is cutoff rather than cut-on.

In view of the fact, therefore, that numerous modifications and departures may now be made by those skilled in this electrical art, the invention herein is to be construed as limited only by the spirit and scope of the appended claims.

What is claimed is:

1. A reversible electronic counter comprising, a plurality of cascaded counter stages each formed of first and second electron tube triodes each having cathode, grid and plate electrodes, means for establishing a common potential level for the cathodes of said first and second electron tubes, first and second pulse transformers each having primary and secondary windings, first, second and third potential sources, means coupling said plates of said first and second electron tubes to said first potential source through said primary windings of said first and second pulse transformers respectively, means for effectively coupling the plate of said first triode to the grid of said second triode and the plate of said second triode to the grid of said first triode, means for reversibly connecting an end of each of said first and second pulse transformer secondary windings to said second and third potential sources respectively, first and second rectifiers respectively connecting the opposite ends of said first and second secondary windings to a common point and poled for passing signals of like polarity thereto, an input circuit for each of said triode grids comprising a rectifier and impedance in series, means for connecting said common point to the input circuits of the first and second grids in the next consecutive counter stage, and means for applying signals to be counted to the input circuits of the grids in the first of said cascaded counter stages.

2. A reversible electronic pulse counter comprising, a plurality of cascaded binary counter stages, each stage including a bistable arrangement of first and second electron tubes each having a cathode, grid and plate, means cross-coupling the plates and grids of said first and second electron tubes, means establishing a reference potential for said cathodes of said first and second tubes, first diodes unilaterally coupling said grids to a common input terminal, a first positive potential source, first and second pulse transformers having primary and secondary windings, means coupling said first and second tube plates to said first positive potential source through said first and second transformer primary windings respectively, second diodes unilaterally coupling an end of each of said secondary windings to a common output terminal, a second positive potential source substantially equal to said reference potential coupled to the opposite end of the secondary of said first transformer in each of said stages, a third positive potential source of magnitude intermediate said first and second sources coupled to the opposite end of the secondary of said second transformer in each of said stages, and means coupling each of said output terminals to the input terminal of the next consecutive stage.

3. A reversible electronic pulse counter comprising, a plurality of cascaded binary counter stages, each stage including a bistable arrangement of first and second electron tubes each having a cathode, grid and plate, means cross-coupling the plates and grids of said first and second electron tubes, means establishing a reference potential for said cathodes of said first and second tubes, first diodes unilaterally coupling said grids to a common input terminal, a first positive potential source, first and second pulse transformers having primary and secondary windings, means coupling said first and second tube plates to said first positive potential source through said first and second transformer primary windings respectively, second diodes unilaterally coupling an end of each of said secondary windings to a common output terminal, a second positive potential source substantially equal to said reference potential coupled to the opposite end of the secondary of said first transformer in each of said stages, a third positive potential source of magnitude intermediate said first and second sources coupled to the opposite end of the secondary of said second transformer in each of said stages, means coupling each of said output terminals to the input terminal of the next consecutive stage, and switching means for interchanging said second and third potential sources with respect to said secondaries of said first and second transformers in each of said counter stages.

4. Apparatus as in claim 3 and including a resistor in series with each of said first diodes between said grids and said common input terminal for rendering operation of each counter stage substantially independent of waveform applied at said input terminal.

5. Apparatus as in claim 3 wherein said first and second diodes are similarly poled for transfer of signals of predetermined polarity from the secondaries of said pulse transformers in each stage to the grids of the next consecutive stage.

6. A reversible electronic pulse counter comprising, a plurality of cascaded binary counter stages, each stage including between an input and output terminal a bistable arrangement of first and second electron tubes each having a cathode, grid and plate, means cross-coupling the plates and grids of said first and second electron tubes, means establishing a reference potential for said cathodes of said first and second electron tubes, a first pair of similarly poled diodes unilaterally coupling said grids to said common input terminal, a first positive potential source, first and second pulse transformers having primary and secondary windings, load resistors coupling said first and second tube plates to said first positive potential source through said first and second transformer windings respectively, a second pair of similarly poled diodes unilaterally coupling one end of each of said secondary windings to said output terminal, a second positive potential source substantially equal to said reference potential coupled to the opposite end of the secondary of said first transformer in each of said counter stages, a third positive potential source of magnitude intermediate said first and second sources coupled to the opposite end of the secondary of said second transformer in each of said counter stages, means for applying pulse signals to be counted to the input terminal of the first of said cascaded counter stages, means connecting each of said output terminals to the input terminal of the next consecutive stage, and switching means for substantially intantaneously interchanging said second and third potential sources with respect to the secondaries of said first and second transformers in each of said counter stages.

References Cited in the file of this patent

UNITED STATES PATENTS

| | | |
|---|---|---|
| 2,501,620 | Skellett | Mar. 21, 1950 |
| 2,537,427 | Seid | Jan. 9, 1951 |
| 2,539,623 | Heising | Jan. 20, 1951 |
| 2,656,106 | Stabler | Oct. 20, 1953 |
| 2,665,845 | Trent | Jan. 12, 1954 |
| 2,735,005 | Steele | Feb. 14, 1956 |

OTHER REFERENCES

Proc. of the IRE, December 1950, "A Digital Electronic Correlator," by Singleton, pages 1422 to 1427.